No. 874,869. PATENTED DEC. 24, 1907.
O. A. SANDBORGH.
CONTROL SYSTEM FOR ELECTRIC VEHICLES.
APPLICATION FILED MAR. 3, 1906.
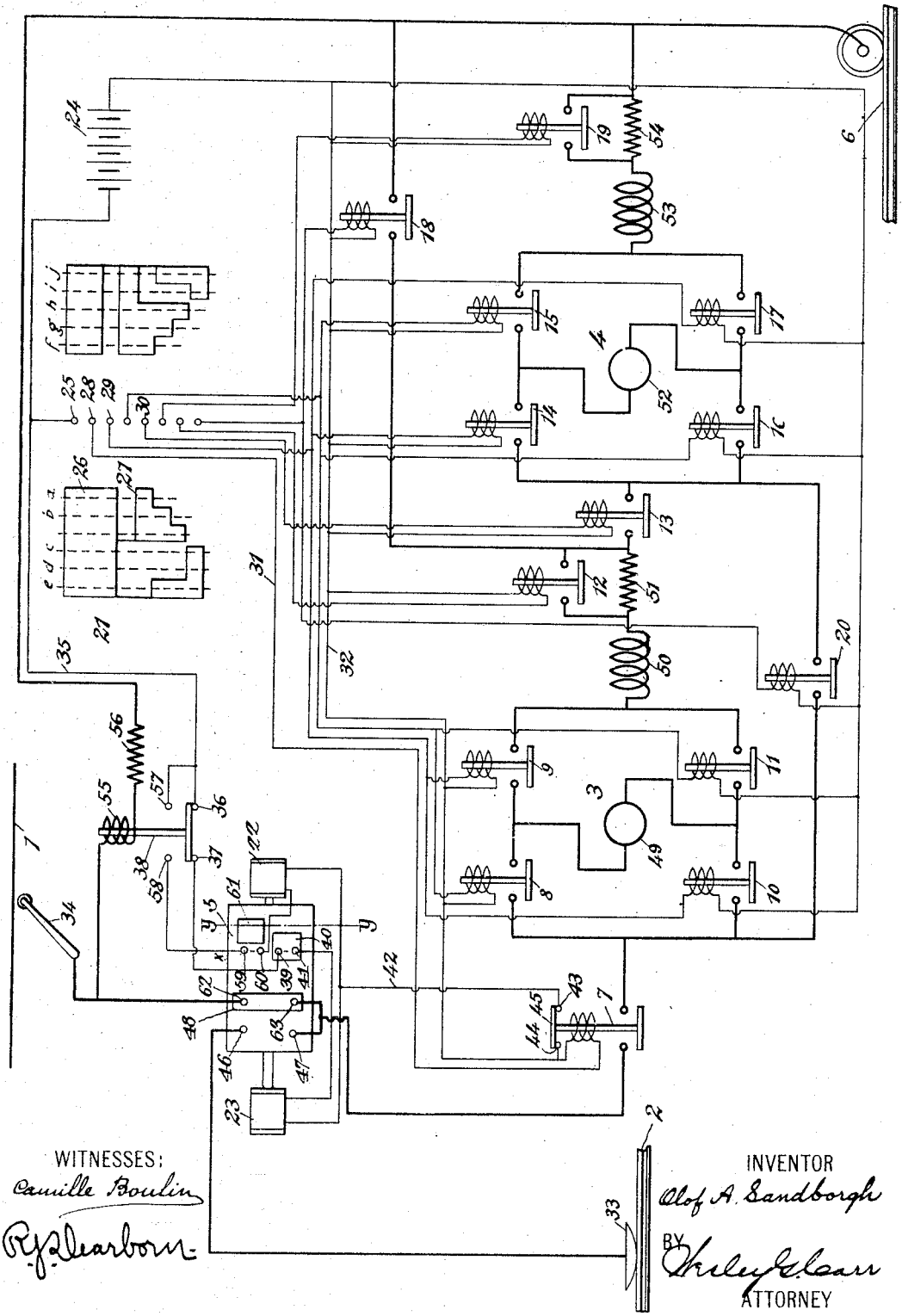
WITNESSES: INVENTOR
Camille Boulin Olof A. Sandborgh
R. J. Dearborn BY
ATTORNEY

UNITED STATES PATENT OFFICE.

OLOF A. SANDBORGH, OF SWISSVALE, PENNSYLVANIA, ASSIGNOR TO WESTINGHOUSE ELECTRIC & MANUFACTURING COMPANY, A CORPORATION OF PENNSYLVANIA.

CONTROL SYSTEM FOR ELECTRIC VEHICLES.

No. 874,869.     Specification of Letters Patent.     Patented Dec. 24, 1907.

Application filed March 3, 1906. Serial No. 304,121.

*To all whom it may concern:*

Be it known that I, OLOF A. SANDBORGH, a citizen of the United States, and a resident of Swissvale, in the county of Allegheny and State of Pennsylvania, have invented a new and useful Improvement in Control Systems for Electric Vehicles, of which the following is a specification.

My invention relates to electric apparatus and has special reference to electric vehicles which are supplied with energy in different sections of their course of travel from dissimilarly located supply conductors.

The object of my invention is to provide a means for automatically completing circuit connections from one current-collecting device to the vehicle motor equipment when said device engages its supply conductor, and for completing circuit connections from a second current-collecting device to the motor equipment when the first is disengaged from its supply conductor.

Existing conditions often make it desirable to supply energy for the propulsion of electric vehicles from dissimilarly located supply conductors; for example, electric railway vehicles are often supplied from a third-rail conductor in sections where such construction is permissible, and are supplied from an overhead trolley conductor in places where the former construction is dangerous or is prohibited by law.

In order to avoid unnecessary delay and to maintain a maximum schedule speed, it is desirable that the change from one supply conductor to the other be effected when the vehicle is in motion.

According to my present invention, I provide means for automatically completing suitable circuit connections between the trolley conductor and the motor equipment as soon as the trolley engages the overhead conductor, and means for automatically reestablishing circuit connections from the third-rail conductor to the motor equipment as soon as the trolley is disengaged from the overhead conductor. In this way, by allowing the trolley and third-rail conductors to overlap for a relatively short distance, so that the trolley may be brought into engagement with the overhead conductor or disengaged therefrom before the third-rail contact shoe is disengaged from its supply conductor or after it moves into engagement with said conductor, as the case may be, the desired speed of the vehicle may be maintained.

The single figure of the accompanying drawing is a diagrammatic view of an improved control system for electric vehicles embodying my invention.

Referring to the drawing, electrical energy may be supplied from a trolley conductor 1 or a third-rail conductor 2 to electric motors 3 and 4 through a selective switching device 5, the circuit being completed, in either case, through an opposite line conductor 6.

The direction of rotation of, and the circuit connections for the motors 3 and 4 are determined by a plurality of electrically-operated switches 7 to 20, inclusive, which are governed by a master controller 21 that is adapted to occupy any one of positions $a, b, c, d, e, f, g, h, i$ and $j$.

The selective switching device 5 may occupy either one of two positions $x$ and $y$, according as magnet winding 22 or magnet winding 23 is energized. When the master controller 21 occupies the position $a$, energy is supplied from a battery 24, through contact finger 25 and contact ring segments 26 and 27, to contact fingers 28, 29 and 30, and from contact finger 28, through conductor 31, to the actuating coil of the switch 7, from which point the circuit is completed through a negative battery conductor 32. Energy is similarly supplied from contact finger 29 to the actuating coils of switches 9, 10, 14 and 17, and from contact finger 30 to the actuating coil of the switch 13.

Assuming that the selective switch 5 occupies position $x$, that a contact shoe 33 is in engagement with the third-rail conductor 2, and that trolley 34 is disengaged from the trolley conductor 1, energy is supplied from battery 24, through conductor 35, contact fingers 36 and 37 of a relay switch 38, contact finger 39 of the device 5, contact member 40, contact finger 41, coil 23, conductor 42, contact fingers 43 and 44 (which are engaged by a bridging contact member 45 when the switch 7 is open,) and conductor 32, to the negative terminal of the battery 24. The coil 23, when energized, moves the selective switch from the position $x$ to position $y$, and the operating magnets for the switches 7, 9, 10, 13, 15 and 16 cause these switches to close, so that a circuit is completed from the supply conductor 2, through contact fingers 46 and 47 of the switch 5, (which are engaged by bridging contact member 48,) switches 7 and 10, armature 49 of the motor 3, switch 9, field magnet winding 50, resistance section 51, switches 13 and 16, armature 52 of the motor 4, switch 15, field magnet winding 53 and resistance section 54 to the opposite line conductor 6. Thus, when the controller 21 occupies position $a$, the motors 3 and 4 are connected in series circuit relation with resistance sections 51 and 54 across the supply line. As the controller 21 is moved to occupy positions $b$, $c$, $d$ and $e$, successively, resistance sections 51 and 54 are short-circuited, motors 3 and 4 are connected in multiple circuit with the resistance sections included in circuit therewith and the resistance sections are finally short-circuited, leaving the two motors connected in multiple circuit across the line without resistance.

The third-rail 2 and the trolley conductor 1 are overlapped for a considerable distance, so that the trolley 34 may be moved into engagement with its supply conductor 1 before the shoe 33 is disengaged from its conductor 2, as the vehicle approaches a section in which energy is received from the overhead trolley conductor. As soon as the trolley 34 engages the conductor 1, energy is supplied therefrom to an actuating coil 55 of the relay switch 38, which is connected in series with a suitable resistance 56 between trolley 34 and opposite line conductor 6. The coil 55, being thus energized, lifts the movable member of the switch 38 and completes a circuit through contact fingers 57 and 58, contact fingers 59 and 60 (which are now bridged by contact members 61 since the switch 5 occupies position $y$), magnet coil 22, and conductor 42, to contact finger 43. The circuit may be completed from this point through bridging contact member 45 and finger 44 of the switch 7 and conductor 32, if the switch is open, but may not be so completed if the switch is closed.

The coil 22, when energized, serves to move the selective switch 5 from position $y$ to position $x$, and, since neither of the magnet coils 22 and 23 can be energized when the switch 7 is closed, as above indicated, it is impossible to change the position of the selective switch when energy is being supplied to the motor equipment. It is therefore necessary, in the system illustrated, for the attendant to move the controller 21 to its "off" position until the position of the selective switch has been changed.

As soon as the selective switch 5 occupies the position $x$ the equipment may be accelerated, as hereinbefore explained, by moving the master controller 21 through the positions $a$, $b$, $c$, $d$ and $e$, the circuit being completed from the trolley conductor 1 through contact fingers 62 and 63 of the switch 5, which are now engaged by the bridging contact member 48, to switch 7, from which point circuits are arranged and completed as hereinbefore explained. If the master controller 21 is moved to occupy positions $f$, $g$, $h$, $i$ and $j$, circuit connections will be similarly completed through the motors 3 and 4, except that the current will pass through the armatures 49 and 52 in the opposite direction, causing a reverse rotation.

It will be observed that the relay switch 38 is adapted to occupy either one of two positions, according as the trolley engages the supply conductor or is disengaged from it, and its magnet winding is energized or de-energized. This fact makes the operation of the selective switch positive and reliable, since it is impossible for both of its actuating magnet windings 22 and 23 to be energized at the same time. The action of the selective switch in either direction is dependent upon the common line switch 7 in order to protect the motor from injury in case the action of the selective switch is delayed for any cause and in order to confine the arcing which accompanies the interruption of the motor circuit to a single switch which may be, and usually is, specially protected.

Although I have illustrated and described my invention in connection with a specific system, it is not restricted thereto and may be applied to various other more or less complicated systems of vehicle motor control.

I claim as my invention:

1. In an electric vehicle, the combination with a trolley, and a second current collecting device and supply conductors therefor, of means independent of the current collecting device for automatically completing a circuit through either the trolley or the current collecting device.

2. In an electric vehicle, the combination with two current collectors, of means for automatically interrupting the circuit through one of the devices and completing the circuit through the other after the latter has come into engagement with its supply conductor, said means comprising a main circuit selective switch, and a selective relay which is energized from the latter of said current collecting devices and which determines the position of the main circuit selective switch.

3. In an electric vehicle, the combination with a motor circuit, two current collecting devices, supply conductors therefor, and a selective switching device for connecting either one of the collecting devices to the motor circuit, of means independent of one collecting device and dependent upon the engagement or disengagement of the other collecting device with or from its supply conductor for governing the operation of the selective switching device.

4. The combination with electric motors, supply conductors therefor, a switching device for selecting one of said conductors, and independent current collecting devices for connecting each conductor with the switching device, of means for automatically actuating said switching device, said means being dependent upon the engagement or the disengagement of one of the independent collecting devices with or from its supply conductor and independent of the other device.

5. In an electric railway system having dissimilarly located supply conductors for different sections, the combination with current collectors adapted to engage the respective supply conductors, a change-over switch, and operating electro-magnets therefor, of automatic means independent of one of the current collectors for selectively energizing said magnets in accordance with the engagement or disengagement of the other current collector with or from its supply conductor.

6. In an electric railway system having dissimilarly located supply conductors for different sections, the combination with current collectors adapted to the respective supply conductors, motor-accelerating switches, and a selective switch, of means for automatically actuating the selective switch to close the one or the other circuit, said means being operative only when the motor accelerating switches are open and being dependent upon the engagement or disengagement of a predetermined current collector with or from its supply conductors.

7. In an electric railway system having dissimilarly located supply conductors for different sections, the combination with current collectors adapted to engage the respective supply conductors, electric motors, accelerating switches therefor, a motor-circuit-interrupting device and a change-over switch, and operating electro-magnets, of a selective relay for the electro-magnets that is energized from one of said current collectors when it engages its supply conductor, said electro-magnets being operative only when the motor-circuit-interrupting device is open.

8. In an electric vehicle, the combination with a trolley and a second current collecting device, of means for automatically completing a circuit through said current collecting device when the trolley is disengaged from its supply conductor, said means comprising a selective relay which is energized by voltage supplied from the trolley.

9. In an electric railway system having dissimilarly located supply conductors for different sections, the combination with current collectors adapted to engage the respective supply conductors, a change-over switch, and operating electro-mangets therefor, of a selective relay that is actuated by energy supplied from one of said current collectors when it engages its supply conductor.

10. In an electric railway system having dissimilarly located supply conductors for different sections, the combination with current collectors adapted to engage the respective supply conductors, electric motors, accelerating switches therefor, a change-over switch, and operating electro-magnets therefor, of automatic means for selectively energizing said magnets in accordance with the engagement or disengagement of one of the current collectors with or from its supply conductor, said means being operative only when the motor circuit is interrupted.

In testimony whereof, I have hereunto subscribed my name this 28th day of February, 1906.

OLOF A. SANDBORGH.

Witnesses:
HOWARD L. BEACH,
BIRNEY HINES.